(12) United States Patent
Yun

(10) Patent No.: US 9,631,717 B2
(45) Date of Patent: Apr. 25, 2017

(54) PLANETARY GEAR TRAIN FOR TRANSMISSION OF MOTOR

(71) Applicant: LG INNOTEK CO., LTD., Seoul (KR)

(72) Inventor: Hongshik Yun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/828,009

(22) Filed: Aug. 17, 2015

(65) Prior Publication Data
US 2015/0354695 A1 Dec. 10, 2015

Related U.S. Application Data

(63) Continuation of application No. 13/546,393, filed on Jul. 11, 2012, now Pat. No. 9,249,876.

(30) Foreign Application Priority Data

Jul. 20, 2011 (KR) .................. 10-2011-0071844
Jul. 22, 2011 (KR) .................. 10-2011-0072975

(51) Int. Cl.
*F16H 3/66* (2006.01)
*F16H 57/08* (2006.01)
*B60K 17/04* (2006.01)

(52) U.S. Cl.
CPC .......... *F16H 57/082* (2013.01); *B60K 17/046* (2013.01); *F16H 3/66* (2013.01);
(Continued)

(58) Field of Classification Search
CPC .... F16H 57/082; F16H 2057/085; F16H 3/66; F16H 2200/2082; F16H 2200/2097; B60K 17/046
(Continued)

(56) References Cited

U.S. PATENT DOCUMENTS 2,363,201 A * 11/1944 Popoff .................... F02N 15/00
　　　　　　　　　　　　　　　　　　　　　475/5
2,514,460 A * 7/1950 Tucker ..................... H02K 7/14
　　　　　　　　　　　　　　　　　　　　　180/10
(Continued)

FOREIGN PATENT DOCUMENTS

CN　　　　201703522 U　　1/2011
DE　　10-2004-023151 A1　12/2005
(Continued)

OTHER PUBLICATIONS

European Search Report dated Sep. 5, 2012 in European Application No. 12175774.4, filed Jul. 10, 2012.

*Primary Examiner* — Roger Pang
(74) *Attorney, Agent, or Firm* — Saliwanchik, Lloyd & Eisenschenk

(57) ABSTRACT

Provided is a planetary gear train for transmission of e-bike motor, including: a carrier protrusively formed in a center with a stator axis insertion boss provided with a stator axis insertion groove in a shape corresponding to that of the stator axis for insertion of the stator axis, and mounted with a plurality of gear installation units; a plurality of planetary gears interposed rotatably mounted at an upper surface of the gear installation unit of the carrier; and a fixing pin rotatably mounting the plurality of planetary gears on the gear installation units, wherein the fixing pin includes a pin head preventing the planetary gears from deviating.

29 Claims, 4 Drawing Sheets

(52) U.S. Cl.
CPC .............. *F16H 2057/085* (2013.01); *F16H 2200/2082* (2013.01); *F16H 2200/2097* (2013.01)

(58) Field of Classification Search
USPC .................................. 475/149–151; 180/372
See application file for complete search history.

(56) References Cited

U.S. PATENT DOCUMENTS

| | | | |
|---|---|---|---|
| 2,830,472 A * | 4/1958 | Brass ................ | F02B 33/00 123/561 |
| 4,656,890 A | 4/1987 | Marquardt | |
| 4,674,360 A | 6/1987 | Matoba | |
| 4,901,602 A | 2/1990 | Matoba | |
| 5,382,203 A | 1/1995 | Bellman et al. | |
| 5,649,879 A * | 7/1997 | Kusumoto ........... | F02N 15/046 475/331 |
| 5,782,716 A * | 7/1998 | Hukui .................. | B62M 6/65 475/149 |
| 6,276,475 B1 * | 8/2001 | Nakanosono ........ | B62M 6/65 180/65.8 |
| 6,702,711 B2 | 3/2004 | Zelikov et al. | |
| 7,357,743 B2 * | 4/2008 | Mao ..................... | H02K 1/146 180/65.7 |
| 8,672,800 B2 | 3/2014 | Nomura et al. | |
| 8,702,549 B2 | 4/2014 | Yoshino et al. | |
| 9,067,582 B2 * | 6/2015 | Smetana ............... | B60K 6/365 |
| 9,249,876 B2 * | 2/2016 | Yun ...................... | F16H 57/082 |
| 2009/0203492 A1 | 8/2009 | Okabe | |
| 2014/0141931 A1 | 5/2014 | Ishizuka | |

FOREIGN PATENT DOCUMENTS

| | | | | |
|---|---|---|---|---|
| DE | 11-2006-002234 B4 | 8/2008 | | |
| DE | 10-2011-076797 A1 | 12/2012 | | |
| EP | 0054852 A1 | 6/1982 | | |
| EP | 0271416 A1 | 6/1988 | | |
| EP | 0755855 A2 * | 1/1997 | ............. | B62M 6/65 |
| GB | 190546 A | 12/1922 | | |
| JP | 60-077838 U | 5/1985 | | |
| JP | 04-025645 A | 1/1992 | | |
| WO | WO-85/00859 A1 | 2/1985 | | |
| WO | WO-2010/132913 A2 | 11/2010 | | |

* cited by examiner

PLANETARY GEAR TRAIN FOR TRANSMISSION OF MOTOR

CROSS-REFERENCE TO RELATED APPLICATIONS

This application is a continuation of U.S. application Ser. No. 13/546,393, filed Jul. 11, 2012, which claims the benefit under 35 U.S.C. §119 of Korean Patent Application Nos. 10-2011-0071844, filed Jul. 20, 2011; and 10-2011-0072975, filed Jul. 22, 2011, which are herein incorporated by reference in their entirety.

BACKGROUND

Field of Invention

The present disclosure relates to a planetary gear train for transmission of e-bike motor.

Background

The pedal cycle may be, for example, a conventional pedal cycle in which drive is only ever provided by a cyclist applying force to the pedals thereof, such cycles sometimes being referred to as "push bikes".

Recently, the pedal cycle has evolved to, for example, a pedelec, an EAPC (electrically-assisted pedal cycle) an electric bicycle or an e-bike. The electrically-assisted pedal cycle (EAPC) or an e-bike is operated by a motor in such a manner that electrical power is used to assist the efforts of a cyclist pedaling the cycle.

Several methods of arranging a motor have been attempted and a recent method is to embed a motor and a transmission inside a hub forming a front wheel or a rear wheel. The hub is integrally formed with the motor and the transmission therein.

The hub includes a hub housing and a stationary shaft. The motor is arranged inside the hub housing, and the stationary shaft is fixed to a front wheel or a rear wheel of a frame of an e-bike or an e-scooter. As a result, the hub housing is rotated relative to the stationary shaft to rotate a wheel of the bike coupled to the hub housing.

The motor is housed inside the hub housing to rotate a rotation shaft by means of the electromagnetic interaction. The motor housing of the motor is fixed relative to the hub housing, and the rotation shaft rotatively arranged in the center of the motor housing transmits a turning effect to a sun gear integrally formed at a distal end thereof, whereby a power is supplied to a transmission including the sun gear.

The transmission is provided with a planetary gear meshed with the sun gear, a margin of the transmission is arranged with a ring gear to mesh with the planetary gear, whereby the transmission receives the turning effect of the rotation shaft in a reduced speed.

Generally, four planetary gears are provided in a pair and rotatably mounted on a carrier to form a planetary gear train. The planetary gear train is formed in such a manner that four planetary gears are rotatably and respectively mounted on a one-bodied carrier using bearings, washers and fixing pins formed on upper and bottom surfaces of the bearing, and a stopper is formed at one surface of the carrier to prevent the respective fixing pins from axially being displaced. Thus, the planetary gear module needs a total of 22 parts including one carrier, one stopper, four planetary gears, bearings, pins and eight washers.

Meanwhile, problems frequently occur in which a washer is lost in the course of coupling the bearings to pins in the assembly process, or the assembly process is advanced with the washer missing due to mistake by an operator, and if the washer is missing in the assembly process, problems may occur in which the fixing pin is detached when deformation is generated by external force.

Another problem is that a manufacturing cost of the one-bodied carrier is very high due to complicated processing method, and the one-bodied carrier cannot be manufactured through a relatively inexpensive sintering or die casting process.

BRIEF SUMMARY

The present disclosure has been made to solve the foregoing problems of the prior art and therefore an object of certain embodiments of the present invention is to provide a structure-improved and manufacturing cost-reduced planetary gear train for transmission of e-bike motor by reducing the number of parts and diversifying a manufacturing method.

In one general aspect of the present disclosure, there is provided a planetary gear train for transmission of e-bike motor, the planetary gear train comprising: a first carrier protrusively formed in a center with a stator axis insertion boss provided with a stator axis insertion groove in a shape corresponding to that of the stator axis for insertion of the stator axis, and mounted with a plurality of first gear installation units; a second carrier formed with a second gear installation unit at a position corresponding to that of the first gear installation unit of the first carrier, and mounted in a center with a boss insertion hole penetratively coupled by the stator axis insertion boss; a plurality of planetary gears interposed between the first and second installation units of the first and second carriers; and a fixing pin rotatably fixing the plurality of planetary gears on the first and second gear installation units.

Preferably, but not necessarily, the planetary gear train for transmission of e-bike motor further includes a bearing centrally arranged on the plurality of the planetary gears, where an outer ring is centrally fixed at the planetary gear and an inner ring is coupled by the fixing pin.

Preferably, but not necessarily, the first and second gear installation units include first and second pin holes each having a diameter corresponding to that of the fixing pin, and first and second support rings protrusively formed at a surface opposite to the planetary gear, and centrally and respectively arranged with first and second pin holes.

Preferably, but not necessarily, the planetary gear is centrally formed with a bearing accommodation hole having a diameter corresponding to that of the outer ring of the bearing.

Preferably, but not necessarily, the inner ring of the bearing includes the fixing pin and a bearing pin hole having a size corresponding to the diameter of the first and second pin hole coupled to the fixing pin.

Preferably, but not necessarily, the first and second support rings respectively support the inner ring of the bearing.

Preferably, but not necessarily, the first and second carriers are provided in a cross (+) shape with four directions being symmetrical, centrally and respectively provided with the stator axis insertion boss and the boss insertion hole, and the first and second gear installation units are provided at four protrusive distal ends to allow four planetary gears to be rotatably mounted.

In another general aspect of the present disclosure, there is provided a planetary gear train for transmission of e-bike motor, the planetary gear train comprising: a carrier protrusively formed in a center with a stator axis insertion boss provided with a stator axis insertion groove in a shape corresponding to that of the stator axis for insertion of the stator axis, and mounted with a plurality of gear installation units; a plurality of planetary gears interposed rotatably mounted at an upper surface of the gear installation unit of the carrier; and a fixing pin rotatably mounting the plurality of planetary gears on the gear installation units, wherein the fixing pin includes a pin head preventing the planetary gears from deviating.

Preferably, but not necessarily, the planetary gear train for transmission of e-bike further includes a bearing centrally arranged on the plurality of the planetary gears, where an outer ring is centrally fixed at the planetary gear and an inner ring is coupled by the fixing pin.

Preferably, but not necessarily, the gear installation units include a pin hole having a diameter corresponding to that of the fixing pin, a support ring protrusively formed at a surface opposite to the planetary gear, and centrally arranged with the pin hole, and a through hole having a diameter smaller than that of the pin hole and formed with a pin support unit at a center of the pin hole.

Preferably, but not necessarily, the planetary gear is centrally formed with a bearing accommodation hole having a diameter corresponding to that of the outer ring of the bearing.

Preferably, but not necessarily, the inner ring of the bearing includes the fixing pin and a bearing pin hole having a size corresponding to the diameter of the pin hole coupled to the fixing pin.

Preferably, but not necessarily, the support ring supports the inner ring of the bearing.

Preferably, but not necessarily, the carrier is provided in a cross (+) shape with four directions being symmetrical, centrally provided with the stator axis insertion boss, and the gear installation unit is provided at four protrusive distal ends to allow four planetary gears to be rotatably mounted.

The planetary gear train for transmission of e-bike motor according to the present disclosure has an advantageous effect in that a carrier can be manufactured in various methods to reduce a manufacturing cost of parts, and to reduce assembleability and parts cost due to reduced number of parts involved in the assembly.

BRIEF DESCRIPTION OF THE DRAWINGS

The drawing figures depict one or more implementations in accord with the present concepts, by way of example only, not by way of limitations. In the figures, like reference numerals refer to the same or similar elements.

The accompanying drawings, which are included to provide a further understanding of the disclosure and are incorporated in and constitute a part of this application, also illustrate embodiment(s) of the disclosure, and together with the description serve to explain the principle of the disclosure. In the drawings.

DETAILED DESCRIPTION

Figure 1:
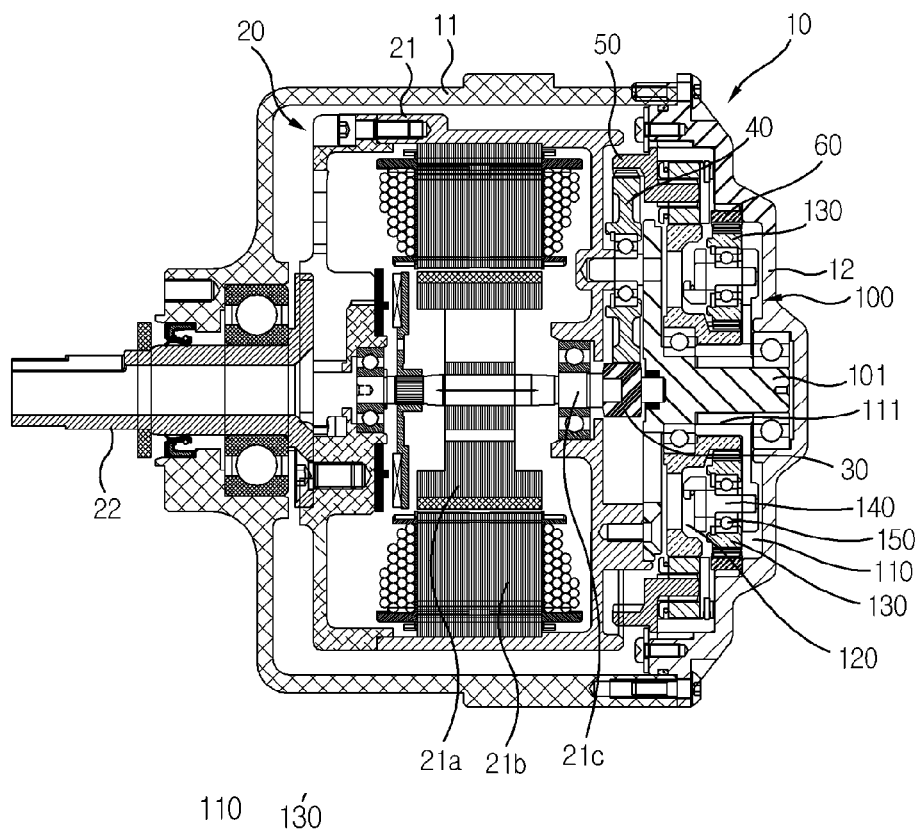
FIG. 1 is a lateral cross-sectional view illustrating a general structure of an e-bike motor according to the present disclosure.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Hereinafter, a planetary gear train for transmission of e-bike motor according to exemplary embodiments of the present disclosure will be described in detail with reference to the accompanying drawings.

FIG. 1 is a lateral cross-sectional view illustrating a general structure of an e-bike motor according to the present disclosure.

Referring to FIG. 1, an e-bike includes a hub housing 11, a motor 20 and a transmission 10.

The hub housing 11 takes an approximately cylindrical shape, and is arranged at a center axis of a front wheel or a rear wheel of the bike. The hub housing 11 may be arranged at a periphery with a bike wheel member, or may be coupled to a hub housing accommodation groove formed at an inner wheel of bike wheel.

Meanwhile, the hub housing 11 is centrally formed with a fixing axis 22. The fixing axis 22 is fixed at a front wheel or a rear wheel side of a frame of an e-bike or an e-scooter. Thus, the hub housing 11 is rotated relative to the fixing axis 22 to rotate the wheel of the bike coupled to the hub housing 11.

The motor 20 is concentrically mounted with the fixing axis 22 inside the hub housing 11. The motor 20 includes a rotor 21a and a stator 21b, and the rotor 21a is centrally mounted with a rotation shaft 21c. The rotation shaft 21c is concentrically mounted with the fixing axis 22, and is mounted at a distal end with a sun gear 30.

The sun gear 30 rotates by receiving a turning effect of the rotation shaft 21c generated by interaction of the rotor 21a mounted inside the motor housing 21 and the stator 21b.

A first planetary gear 40 is meshed with the sun gear 30 to rotate in association with rotation of the sun gear 30. At least three first planetary gears 40 are provided, and a periphery of the planetary gear 40 is meshed by a first ring gear 50. The first ring gear 50 is rotated in association with rotation of the first planetary gears 40. The first ring gear 50 is arranged at a periphery with a second ring gear 60, where the second ring gear 60 is rotated by being coupled to a hub cover 12 forming an exterior look of a distal end of the hub housing 11.

A connection member is interposed between the first ring gear 50 and the second ring gear 60 to directly transmit or block a turning effect in response to a rotation direction.

For example, the rotation of the first ring gear 50 is directly transmitted to the second ring gear (6) by the connection member, in case of rotation to one direction of the rotation shaft, and the housing is rotated by rotation of the hub gear 12 coupled to the second ring gear 60.

Meantime, in case of rotation to the other direction of the rotation shaft, the direct transfer of the turning effect to the second ring gear 60 of the first ring gear 50 is blocked, and change and transfer of rotation direction is performed by a planetary gear train 100 concentrically supported by a stator shaft 101 via the connection member to rotate the second ring gear 60 to a direction.

Figure 2:
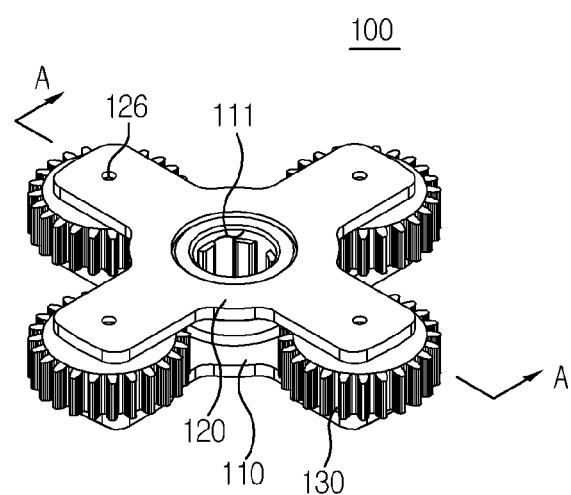
FIG. 2 is a perspective view of a planetary gear train of FIG. 1 according to a first exemplary embodiment of the present disclosure.
Figure 3:
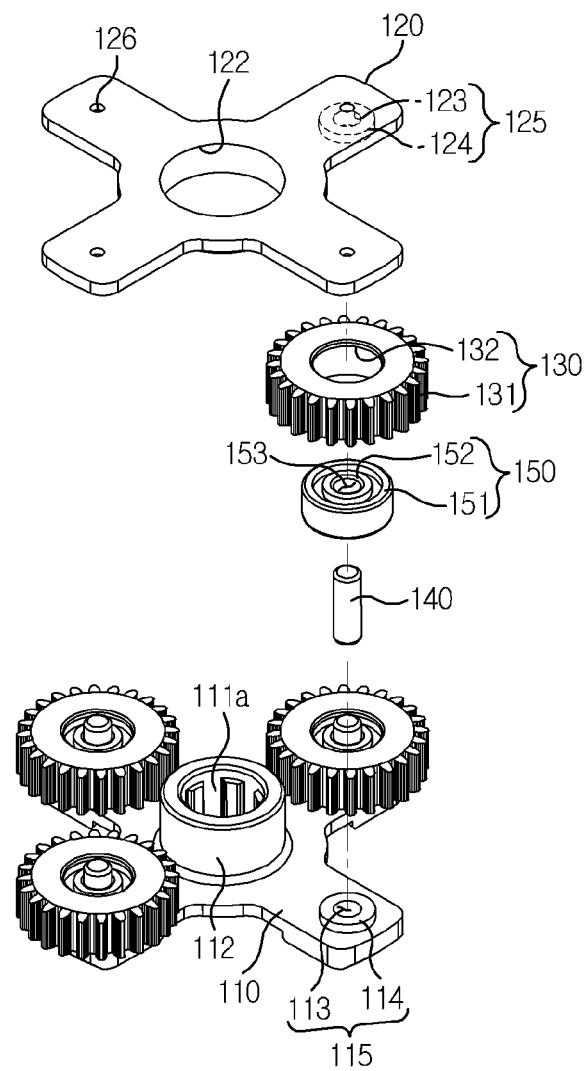
FIG. 3 is an exploded perspective view of a planetary gear module of an e-bike according to an exemplary embodiment of the present disclosure.
Figure 4:
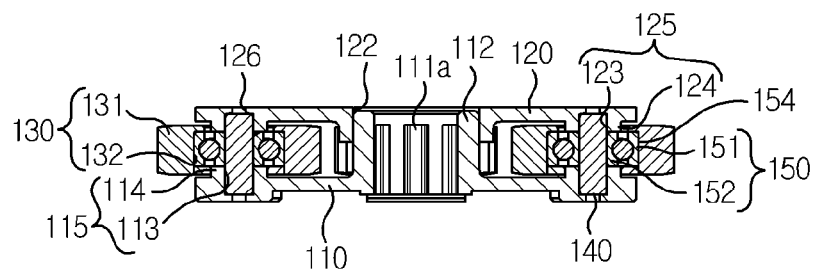
FIG. 4 is a cross-sectional view taken along line A-A of FIG. 2.

According to a first exemplary embodiment of the present disclosure, the planetary gear train 100 includes first and second carriers 110, 120, second planetary gears 130 and a fixing pin 140, as illustrated in FIGS. 2, 3 and 4.

The first carrier 110 takes an approximate shape of a plate, and preferably takes a cross (+) shape with four directions being symmetrical, as shown in FIGS. 2 and 3, which is to mount a total of four second planetary gears 130, where each protrusive distal end is provided with a first gear installation unit 115 for mounting the second planetary gear 130.

The first carrier 110 is centrally and protrusively formed with a stator axis insertion boss 112 formed with a stator shaft insertion groove 111 having a shape corresponding to a diameter of the stator shaft 101. The stator shaft insertion groove 111 is protrusively formed at an inner surface with a plurality of slip prevention ribs 111a supporting a fixed position and preventing the stator shaft 101 from running idle to a direction parallel to an insertion direction.

The first gear installation unit 115 is formed at a distal end of the first carrier 110 to allow the second planetary gear 130 to rotate, and includes a first pin hole 113 insertedly coupled by a fixing pin 140 fixedly and rotatably supporting the second planetary gear 130, and a first support ring 114 centrally having the first pin hole 113 and protruded at a predetermined height.

The first support ring 114 functions in the same way as that of a conventional washer member, and preferably, supports an inner ring 152 of a bearing 150 coupled to the second planetary gear (130, described later).

The second carrier 120 takes an approximate shape of a plate, and preferably takes a cross (+) shape with four directions being symmetrical, as shown in FIGS. 2 and 3, which is to mount a total of four second planetary gears 130, where each protrusive distal end is provided with a second gear installation unit 125 for mounting the second planetary gear 130.

The second carrier 120 is centrally formed with a boss insertion hole 122 press-fitted by the stator axis insertion boss 112 coupled with the stator shaft 101.

The second gear installation unit 125 is formed at a distal end of the second carrier 120 to allow the second planetary gear 130 to rotate, and includes a second pin hole 123 insertedly coupled by the fixing pin 140 fixedly and rotatably supporting the second planetary gear 130, and a second support ring 124 centrally having the second pin hole 123 and protruded at a predetermined height.

The second support ring 124 functions in the same way as that of a conventional washer member, and preferably, supports an inner ring 152 of a bearing 150 coupled to the second planetary gear (130, described later).

The second planetary gear 130 is rotatably mounted on the first and second gear installation units 115, 125 each provided at the first and second carriers 110, 120. The second planetary gear 130 is meshed with the second ring gear 60 to block the rotation of the second ring gear 60.

The second planetary gear 130 is formed at a periphery with a gear tooth 131, and is formed at an inner surface with a bearing accommodation hole 154 coupled with an outer ring 151 of the bearing 150. A diameter of the bearing accommodation hole 154 is same as that of the outer ring 151 of the bearing 151.

Meanwhile, the bearing 150 is provided to minimize a friction generated when the second planetary gear 130 is rotated, and includes an outer ring 151 and an inner ring 152. A ball member is interposed between the outer ring and the inner ring 151, 152, and serves to smooth a relative rotation between the outer ring 151 and the inner ring 152.

The inner ring 152 is centrally formed with a bearing pin hole 153 having a diameter corresponding to that of the fixing pin 140. Although the present disclosure has exemplified the bearing 150 as a ball bearing, the present disclosure is not limited thereto, and other types of bearings including an air bearing and a magnetic bearing may be used, when the need arises.

The fixing pin 140 is insertedly coupled from an inner side toward an outer side of the first and second pin holes 113, 123 penetratively formed at the first and second gear installation units 115, 125 each provided at the first and second carriers 110, 120. At this time, distal ends of the first and second pin holes 113, 123 are formed with first and second through holes 116, 126 each having a diameter smaller than that of the first and second pin holes 113, 123, such that the fixing pin 140 cannot penetrate the first and second pin holes 113, 123. Thus, the fixing pin 140 interposed between the first and second carriers 110, 120 is not feared to deviate to an axial direction, even if a separate stopper is not installed.

Furthermore, the fixing pin 140 is penetratively coupled to the bearing pin hole 153 centrally formed at the inner ring 152 of the bearing 150 to supportively and rotatably fix the second planetary gear 130, and both ends of the fixing pin 140 are coupled to the first and second pin holes 113, 123 to fix the first and second carriers 110, 120. In order to insertively couple the both ends of the fixing pin 140 to the first and second carriers 110, 120, there is a need of press-fitting by performing a press-fit process.

That is, the planetary gear train 100 according to the present disclosure arranges the first and second carriers 110, 120, the second planetary gear 130 mounted with the bearing 150 and the fixing pin 140 at each assembly position. Furthermore, the bearing 150 is press-fitted to the center of the second planetary gear 130, the fixing pin 140 is penetratively coupled to the bearing pin hole 153 centrally formed at the inner ring 152 of the bearing 150, the second planetary gears 130 where a total of four bearing pin hole 153 is press-fitted by the fixing pin 140 are arranged on the first and second gear installation units 115, 125 of the first carrier 110 or the second carrier 120, and both ends of the fixing pin 140 is press-fitted from an inner side toward the outer side of the first and second carriers 110, 120.

Figure 5:
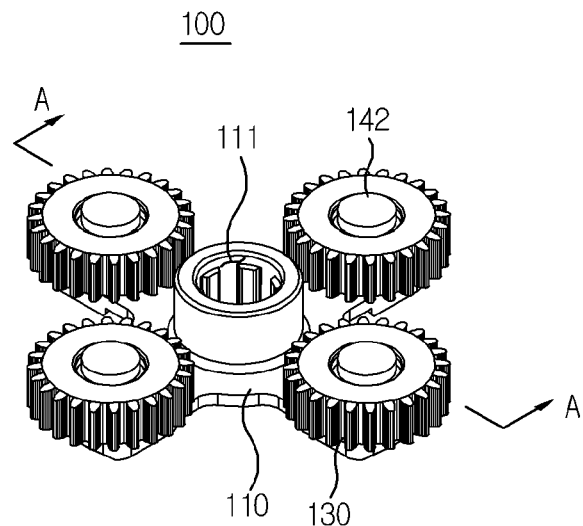
FIG. 5 is a perspective view of a planetary gear train of FIG. 1 according to another exemplary embodiment of the present disclosure.
Figure 6:
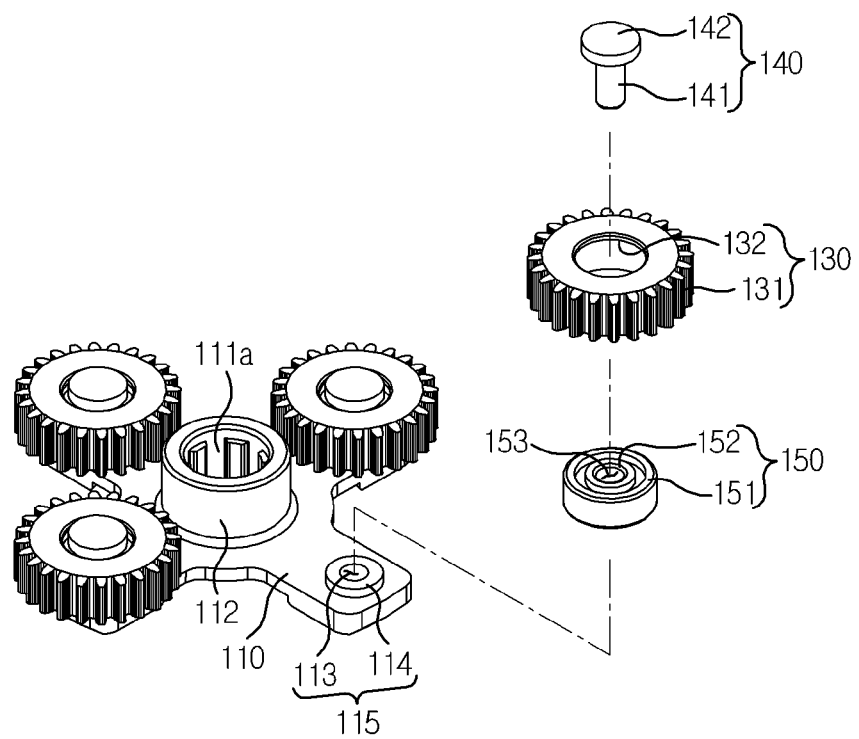
FIG. 6 is an exploded perspective view of a planetary gear module of an e-bike according to a second exemplary embodiment of the present disclosure.
Figure 7:
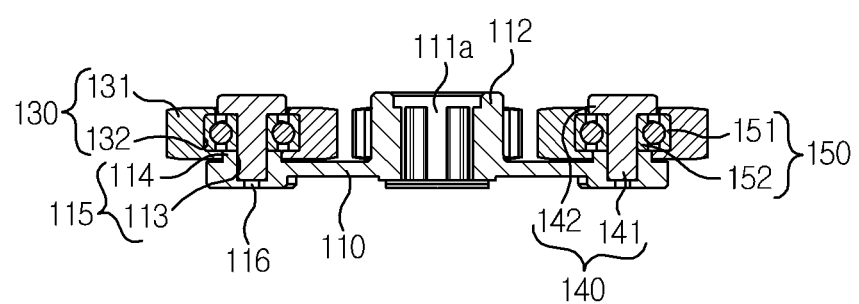
FIG. 7 is a cross-sectional view taken along line B-B of FIG. 5.

According to the second exemplary embodiment of the present disclosure, the planetary gear train 100 may include a carrier 110, second planetary gears 130 and the fixing pin 140, as illustrated in FIGS. 5, 6 and 7.

The carrier 110 takes an approximate shape of a plate, and preferably takes a cross (+) shape with four directions being symmetrical, as shown in FIGS. 5 and 6, which is to mount a total of four second planetary gears 130, where each protrusive distal end is provided with a second gear installation unit 125 for mounting the second planetary gear 130.

The carrier 110 is centrally and protrusively formed with a stator axis insertion boss 112 formed with a stator shaft insertion groove 111 having a shape corresponding to a diameter of the stator shaft 101. The stator shaft insertion groove 111 is protrusively formed at an inner surface with a plurality of slip prevention ribs 111a supporting a fixed position and preventing the stator shaft 101 from running idle to a direction parallel to an insertion direction.

The gear installation unit 115 is formed at a distal end of the carrier 110 to allow the second planetary gear 130 to rotate, and includes a first pin hole 113 insertedly coupled by the fixing pin 140 fixedly and rotatably supporting the second planetary gear 130, and a first support ring 114 centrally having the first pin hole 113 and protruded at a predetermined height.

The first support ring 114 functions in the same way as that of a conventional washer member, and preferably, supports an inner ring 152 of a bearing 150 coupled to the second planetary gear (130, described later).

The second planetary gear 130 is rotatably mounted on the gear installation unit 115 provided at the carrier 110. The second planetary gear 130 is meshed with the second ring gear 60 to block the rotation of the second ring gear 60.

The second planetary gear 130 is formed at a periphery with a gear tooth 131, and is formed at an inner surface with a bearing accommodation hole 154 coupled with an outer ring 151 of the bearing 150. A diameter of the bearing accommodation hole 154 is same as that of the outer ring 151 of the bearing 151.

Meanwhile, the bearing 150 is provided to minimize a friction generated when the second planetary gear 130 is rotated, and includes an outer ring 151 and an inner ring 152. A ball member is interposed between the outer ring and the inner ring 151, 152, and serves to smooth a relative rotation between the outer ring 151 and the inner ring 152.

The inner ring 152 is centrally formed with a bearing pin hole 153 having a diameter corresponding to that of the fixing pin 140. Although the present disclosure has exemplified the bearing 150 as a ball bearing, the present disclosure is not limited thereto, and other types of bearings including an air bearing and a magnetic bearing may be used, when the need arises.

The fixing pin 140 includes a pin body 141 and a pin head 142. The pin body 141 is insertedly coupled from an inner side toward an outer side of the pin holes 113 penetratively formed at the gear installation unit 115 provided at the carrier 110. At this time, a distal end of the pin hole 113 is formed with a through holes 116 having a diameter smaller than that of the pin hole 113, such that the fixing pin 140 cannot penetrate the pin holes 113. Furthermore, the pin head supports the inner ring 152 of the bearing 150 to allow the second planetary gear 130 to be supported by the pin head 142 to prevent from being deviated from an installation position.

The pin body 141 of the fixing pin 140 is penetratively coupled to a bearing pin hole 153 centrally formed at the inner ring 152 of the bearing 150 from an upper side to a bottom side, as shown in the exploded perspective view of FIG. 3, to rotatably and supportively fix the second planetary gear 130. Thus, the second planetary gear 130 can be rotated at a distal end of one side by the fixing pin 140 coupled to the pin hole 113, and can be so installed as to be prevented from being deviated.

In order to insert both ends of the pin body 141 of the fixing pin 140 to the pin hole 113, there is a need of press-fitting by performing a press-fit process. The need to perform the press-fitting process is to prevent the press-fitted fixing pin 140 from being easily deviated from the pin hole 113.

According to the configuration thus described, the shape of carrier can be simplified to enable manufacturing of the carrier in various methods including die casting and sintering, and the carrier needs no complicated processing after manufacturing, to reduce the cost involved in parts manufacturing.

Furthermore, although two washer members were needed for each second planetary gear 130 according to prior art, the function of washer members can be replaced by the fact that the support ring 114 integrally formed with the gear installation unit 115 of the carrier 110 supports the inner ring 152 of the bearing 150, such that a total of eight washer members according to the prior art can be omitted by the present disclosure As apparent from the foregoing, the planetary gear train for transmission of e-bike motor according to the present disclosure has an industrial applicability in that a carrier can be manufactured in various methods to reduce a manufacturing cost of parts, and to reduce assembleability and parts cost due to reduced number of parts involved in the assembly.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transmission of e-bike motor, the transmission of e-bike motor comprising:
a first planetary gear system;
a second planetary gear system; and
a connection member interposed between the first planetary gear system and the second planetary gear system to transmit or block a turning effect in response to a rotation direction,
wherein the second planetary gear system comprises:
a first carrier having a shaft insertion hole formed to be coupled with a shaft;
a planetary gear coupled to the first carrier;
a fixing pin coupled to the first carrier for rotatably supporting the planetary gear; and
a bearing disposed between the fixing pin and the planetary gear for rotatably supporting the planetary gear;
wherein a rotation of the first planetary gear system is transmitted to the second planetary gear system by the connection member, in case the first planetary gear system rotates in one direction, and
wherein a rotation of the first planetary gear system is blocked to the second planetary gear system by the connection member, in case the first planetary gear system rotates in another direction.

2. The transmission of e-bike motor of claim 1, wherein the first carrier further has a first gear installation unit coupled to the fixing pin,
wherein the first gear installation unit includes a first support ring protruded from an inner surface of the first carrier to rotatably support the bearing,
wherein the first support ring is formed with a pin hole in an inner circumference thereof to prevent a penetration of the fixing pin.

3. The transmission of e-bike motor of claim 2, wherein the pin hole is coupled to the fixing pin, and
wherein the pin hole has a diameter corresponding to that of the fixing pin.

4. The transmission of e-bike motor of claim 1, wherein the bearing includes an outer ring fixed at the planetary gear and an inner ring coupled by the fixing pin, and
wherein the planetary gear is formed with a bearing accommodation hole having a diameter corresponding to that of the outer ring of the bearing.

5. The transmission of e-bike motor of claim 2, wherein an inner ring of the bearing includes a bearing pin hole having a diameter corresponding to a diameter of the pin hole coupled to the fixing pin.

6. The transmission of e-bike motor of claim 2, wherein the bearing includes an outer ring fixed at the planetary gear and an inner ring coupled by the fixing pin, and
wherein the first support rings supports the inner ring of the bearing.

7. The transmission of e-bike motor of claim 2, wherein the first carrier is provided in a cross shape with four directions being symmetrical, centrally provided with the shaft insertion hole, and the first gear installation units are provided at four protrusive distal ends to allow four planetary gears to be rotatably mounted.

8. The transmission of e-bike motor of claim 2, wherein a first through hole is formed at a distal end of the pin hole.

9. The transmission of e-bike motor of claim 8, wherein the first through hole has a diameter smaller than that of the pin hole.

10. A transmission of e-bike motor, the transmission of e-bike motor comprising:
a first planetary gear system;
a second planetary gear system; and
a connection member interposed between the first planetary gear system and the second planetary gear system to transmit or block a turning effect in response to a rotation direction,
wherein the second planetary gear system comprises:
a first carrier having a shaft insertion hole formed to be coupled with a shaft;
a planetary gear coupled to the first carrier;
a fixing pin coupled to the first carrier for rotatably supporting the planetary gear;
and
a bearing disposed between the fixing pin and the planetary gear for rotatably supporting the planetary gear;
wherein the first planetary gear system includes a first ring gear, and the second planetary gear system includes a second ring gear, and
wherein the connection member is interposed between the first ring gear and the second ring gear to transmit or block a turning effect in response to a rotation direction.

11. The transmission of e-bike motor of claim 10, wherein a rotation of the first planetary gear system is transmitted to the second planetary gear system by the connection member, in case the first planetary gear system rotates in one direction, and
wherein a rotation of the first planetary gear system is blocked to the second planetary gear system by the connection member, in case the first planetary gear system rotates in another direction.

12. The transmission of e-bike motor of claim 10, wherein the first carrier further has a first gear installation unit coupled to the fixing pin,
wherein the first gear installation unit includes a first support ring protruded from an inner surface of the first carrier to rotatably support the bearing, and
wherein the first support ring is formed with a pin hole in an inner circumference thereof to prevent a penetration of the fixing pin.

13. The transmission of e-bike motor of claim 12, wherein the pin hole is coupled to the fixing pin, and
wherein the pin hole has a diameter corresponding to that of the fixing pin.

14. The transmission of e-bike motor of claim 10, wherein the bearing includes an outer ring fixed at the planetary gear and an inner ring coupled by the fixing pin, and
wherein the planetary gear is formed with a bearing accommodation hole having a diameter corresponding to that of the outer ring of the bearing.

15. The transmission of e-bike motor of claim 12, wherein an inner ring of the bearing includes a bearing pin hole having a diameter corresponding to a diameter of the pin hole coupled to the fixing pin.

16. The transmission of e-bike motor of claim 12, wherein the bearing includes an outer ring fixed at the planetary gear and an inner ring coupled by the fixing pin, and
wherein the first support rings supports the inner ring of the bearing.

17. The transmission of e-bike motor of claim 12, wherein the first carrier is provided in a cross shape with four directions being symmetrical, centrally provided with the shaft insertion hole, and the first gear installation units are provided at four protrusive distal ends to allow four planetary gears to be rotatably mounted.

18. The transmission of e-bike motor of claim 12, wherein a first through hole is formed at a distal end of the pin hole.

19. The transmission of e-bike motor of claim 18, wherein the first through hole has a diameter smaller than that of the pin hole.

20. A transmission of e-bike motor, the transmission of e-bike motor comprising:
a first planetary gear system;
a second planetary gear system; and
a connection member interposed between the first planetary gear system and the second planetary gear system to transmit or block a turning effect in response to a rotation direction,
wherein the second planetary gear system comprises:
a first carrier having a shaft insertion hole formed to be coupled with a shaft;
a second carrier coupled with the first carrier;
a planetary gear coupled to the first carrier and the second carrier;
a fixing pin coupled to the first carrier and the second carrier for rotatably supporting the planetary gear: and
a bearing disposed between the fixing pin and the planetary gear for rotatably supporting the planetary gear;
wherein the second carrier further has a second gear installation unit coupled to the fixing pin,
wherein the second gear installation unit includes a second support ring protruded from an inner surface of the second carrier to rotatably support the bearing, and
wherein the second support ring is formed with a pin hole in an inner circumference thereof to prevent a penetration of the fixing pin.

21. The transmission of e-bike motor of claim 20, wherein a rotation of the first planetary gear system is transmitted to the second planetary gear system by the connection member, in case the first planetary gear system rotates in one direction, and
wherein a rotation of the first planetary gear system is blocked to the second planetary gear system by the connection member, in case the first planetary gear system rotates in another direction.

22. The transmission of e-bike motor of claim 20, wherein the first planetary gear system includes a first ring gear, and the second planetary gear system includes a second ring gear, and
wherein the connection member is interposed between the first ring gear and the second ring gear to transmit or block a turning effect in response to a rotation direction.

23. The transmission of e-bike motor of claim 20, wherein the pin hole is coupled to the fixing pin, and
wherein the pin hole has a diameter corresponding to that of the fixing pin.

24. The transmission of e-bike motor of claim 20, wherein the bearing includes an outer ring fixed at the planetary gear and an inner ring coupled by the fixing pin, and
wherein the planetary gear is formed with a bearing accommodation hole having a diameter corresponding to that of the outer ring of the bearing.

25. The transmission of e-bike motor of claim 20, wherein an inner ring of the bearing includes a bearing pin hole having a diameter corresponding to a diameter of the pin hole coupled to the fixing pin.

26. The transmission of e-bike motor of claim 20, wherein the bearing includes an outer ring fixed at the planetary gear and an inner ring coupled by the fixing pin, and
wherein the first support rings supports the inner ring of the bearing.

27. The transmission of e-bike motor of claim 20, wherein the first carrier is provided in a cross shape with four directions being symmetrical, centrally provided with the shaft insertion hole, and the first gear installation units are provided at four protrusive distal ends to allow four planetary gears to be rotatably mounted.

28. The transmission of e-bike motor of claim 20, wherein a first through hole is formed at a distal end of the pin hole.

29. The transmission of e-bike motor of claim 28, wherein the first through hole has a diameter smaller than that of the pin hole.

* * * * *